(12) United States Patent
Liao et al.

(10) Patent No.: US 12,257,582 B2
(45) Date of Patent: Mar. 25, 2025

(54) SAMPLE PRELIMINARY SCREENING CHIP, SPECIMEN DETECTING METHOD, AND SCREENING DEVICE

(71) Applicants: Beijing BOE Sensor Technology Co., Ltd., Beijing (CN); BOE Technology Group Co., Ltd., Beijing (CN)

(72) Inventors: Hui Liao, Beijing (CN); Yingying Zhao, Beijing (CN); Wenliang Yao, Beijing (CN); Bolin Fan, Beijing (CN); Nan Zhao, Beijing (CN); Le Gu, Beijing (CN); Yongjia Gao, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 789 days.

(21) Appl. No.: 16/898,516

(22) Filed: Jun. 11, 2020

(65) Prior Publication Data
US 2021/0187507 A1    Jun. 24, 2021

(30) Foreign Application Priority Data
Dec. 18, 2019    (CN) .......................... 201911307664.1

(51) Int. Cl.
*B01L 3/00*        (2006.01)
*G01N 21/65*       (2006.01)

(52) U.S. Cl.
CPC ... *B01L 3/502761* (2013.01); *B01L 3/502792* (2013.01); *G01N 21/65* (2013.01); *B01L 2200/143* (2013.01); *B01L 2400/086* (2013.01)

(58) Field of Classification Search
CPC .............. G01N 21/65; B01L 3/502761; B01L 3/502792
See application file for complete search history.

(56) References Cited

FOREIGN PATENT DOCUMENTS

| | | | |
|---|---|---|---|
| CN | 103589629 | A | 2/2014 |
| CN | 104140926 | A | 11/2014 |
| CN | 104297298 | A | 1/2015 |
| CN | 106076441 | A | 11/2016 |
| CN | 107828651 | A | 3/2018 |
| CN | 109351370 | A | 2/2019 |

(Continued)

OTHER PUBLICATIONS

Chinese Office Action for 201911307664.1 issued on Feb. 16, 2023.
Chinese Office Action for 201911307664.1 issued on Aug. 4, 2023.

*Primary Examiner* — Brian R Gordon
*Assistant Examiner* — Dwan A Gerido
(74) *Attorney, Agent, or Firm* — ArentFox Schiff LLP; Michael Fainberg

(57) ABSTRACT

The present disclosure discloses a sample preliminary screening chip, a specimen detecting method and a screening device. A data processor may be configured to control a sample solution containing a specimen to be added into a preliminary screening inlet of the sample preliminary screening chip, and control the sample solution in the preliminary screening inlet to enter a channel, successively to flow through a first preliminary screening area and a second preliminary screening area, and to flow out from a preliminary screening outlet so as to store a liquid with the specimen in a first preliminary screening area. In this way, the liquid containing the specimen may be screened preliminarily.

16 Claims, 5 Drawing Sheets

(56) References Cited

FOREIGN PATENT DOCUMENTS

| | | | |
|---|---|---|---|
| CN | 110339876 | A | 10/2019 |
| CN | 110496655 | A | 11/2019 |
| WO | 2019035952 | A1 | 2/2019 |

SAMPLE PRELIMINARY SCREENING CHIP, SPECIMEN DETECTING METHOD, AND SCREENING DEVICE

CROSS-REFERENCE TO RELATED APPLICATIONS

This application claims priority to Chinese Patent Application No. 201911307664.1, filed on Dec. 18, 2019, which is hereby incorporated by reference in its entirety.

FIELD

The present disclosure relates to the field of display technology, and in particular relates to a sample preliminary screening chip, a specimen detecting method, and a screening device.

BACKGROUND

In the microfluidics technology, basic operation components for sample preparation, reaction, separation, detection and the like in biological, chemical and medical analysis processes are integrated on one micrometer-scale chip to automatically implement an entire analysis process. Due to the huge potential of the microfluidics technology in the fields of biology, chemistry, medicine and the like, it has developed into a brand-new research field where biology, chemistry, medicine, fluids, electronics, materials, machinery, and other disciplines cross each other.

SUMMARY

Embodiments of the present disclosure provide a sample preliminary screening chip, a specimen detecting method, and a screening device, for separating out and detecting a specimen.

An embodiment of the present disclosure provides a sample preliminary screening chip, including:
- a first preliminary screening substrate and a second preliminary screening substrate fitted to each other;
- at least one channel encapsulated between the first preliminary screening substrate and the second preliminary screening substrate; and
- a preliminary screening inlet in one end of the channel, and a preliminary screening outlet in the other end of the channel; wherein
- the preliminary screening inlet and the preliminary screening outlet run through the first preliminary screening substrate or the second preliminary screening substrate; the channel includes a first preliminary screening area proximate to the preliminary screening inlet and a second preliminary screening area proximate to the preliminary screening outlet; and
- a size, in an extending direction perpendicular to a plane on which the first preliminary screening area is located, of the first preliminary screening area is greater than a maximum particle diameter of a specimen contained in a sample solution, and a size, in the extending direction, of the second preliminary screening area is smaller than a minimum particle diameter of the specimen.

Optionally, in the embodiment of the present disclosure, the sample preliminary screening chip further includes:
- a groove structure on a side of the first preliminary screening substrate facing the second preliminary screening substrate; and the groove structure forms the channel; wherein
- a maximum width, in the extending direction, of the groove structure in the first preliminary screening area is greater than the maximum particle diameter of the specimen; and a maximum width, in the extending direction, of the groove structure in the second preliminary screening area is smaller than the minimum particle diameter of the specimen.

Optionally, in the embodiment of the present disclosure, the specimen is circulating tumor cells; the sample solution is blood; and the particle diameter of the specimen ranges from 15 μm to 30 μm.

An embodiment of the present disclosure provides a specimen detecting method, including:
- controlling, by a data processor, a sample solution containing a specimen to be added into a preliminary screening inlet of a sample preliminary screening chip;
- controlling, by the data processor, the sample solution in the preliminary screening inlet to enter a channel, successively to flow through a first preliminary screening area and a second preliminary screening area, and to flow out from a preliminary screening outlet so as to store a liquid with the specimen in the first preliminary screening area, wherein the sample preliminary screening chip is the sample preliminary screening chip according to claim 1;
- controlling, by the data processor, the liquid in the first preliminary screening area to flow into a liquid storage tank of a microfluidic chip;
- controlling, by the data processor, the microfluidic chip to separate multiple independent micro-sized micro-droplets from a liquid in the liquid storage tank, wherein a size of each of the micro-droplets is the sum of a maximum particle diameter of the specimen and an extended value;
- acquiring, by the data processor, Raman spectra corresponding to the respective micro-droplets; and
- controlling, by the data processor, the microfluidic chip to move the micro-droplets with the specimen into a specimen storage tank according to the Raman spectra corresponding to the respective micro-droplets.

Optionally, in the embodiment of the present disclosure, the controlling, by the data processor, the microfluidic chip to move the micro-droplets with the specimen into a specimen storage tank according to the Raman spectra corresponding to the respective micro-droplets specifically includes:
- acquiring, by the data processor, characteristic peak data in the Raman spectra corresponding to the respective micro-droplets;
- determining, by the data processor 300, whether the micro-droplet contains a specimen for each of the micro-droplets, by comparing the characteristic peak data corresponding to the micro-droplet with a pre-stored corresponding relationship between a specimen and characteristic peak data; and
- controlling, by the data processor, the microfluidic chip to move the micro-droplet with the specimen into a specimen storage tank in response to the micro-droplet containing the specimen.

Optionally, in the embodiment of the present disclosure, the controlling, by the data processor, the microfluidic chip to move the micro-droplet with the specimen into a specimen storage tank includes:
- generating, by the data processor, a first level signal; and controlling, by the data processor, the microfluidic chip to move the micro-droplets with the specimen into the specimen storage tank by providing the first level signal to the microfluidic chip.

Optionally, in the embodiment of the present disclosure, the method further includes:

generating, by the data processor, a second level signal in response to the micro-droplet not containing the specimen; and controlling, by the data processor, the microfluidic chip to move the micro-droplets into a non-specimen storage tank by providing the second level signal to the microfluidic chip.

Optionally, in the embodiment of the present disclosure, the acquiring, by the data processor, Raman spectra corresponding to the respective micro-droplets includes:

controlling, by the data processor, a Raman spectrometer with a set laser wavelength to scan the micro-droplets; and collecting, by the data processor, the Raman spectra corresponding to the respective micro-droplets.

Optionally, in the embodiment of the present disclosure, after the controlling, by the data processor, the microfluidic chip to move the micro-droplets with the specimen into the specimen storage tank according to the Raman spectra corresponding to the respective micro-droplets, the method further includes:

controlling, by the data processor, a detecting device to detect a specimen in the specimen storage tank.

An embodiment of the present disclosure provides a screening device, including a sample preliminary screening chip, a microfluidic chip, and a data processor, wherein the sample preliminary screening chip is the above-mentioned sample preliminary screening chip; and the data processor is configured to perform the above-mentioned specimen detecting method.

Optionally, in the embodiment of the present disclosure, the screening device further includes a detecting device; and the data processor is further configured to control the detecting device to detect a specimen in a specimen storage tank after controlling the microfluidic chip to move micro-droplets with the specimen into the specimen storage tank according to Raman spectra corresponding to the respective micro-droplets.

DETAILED DESCRIPTION OF THE EMBODIMENTS

Figure 1A:
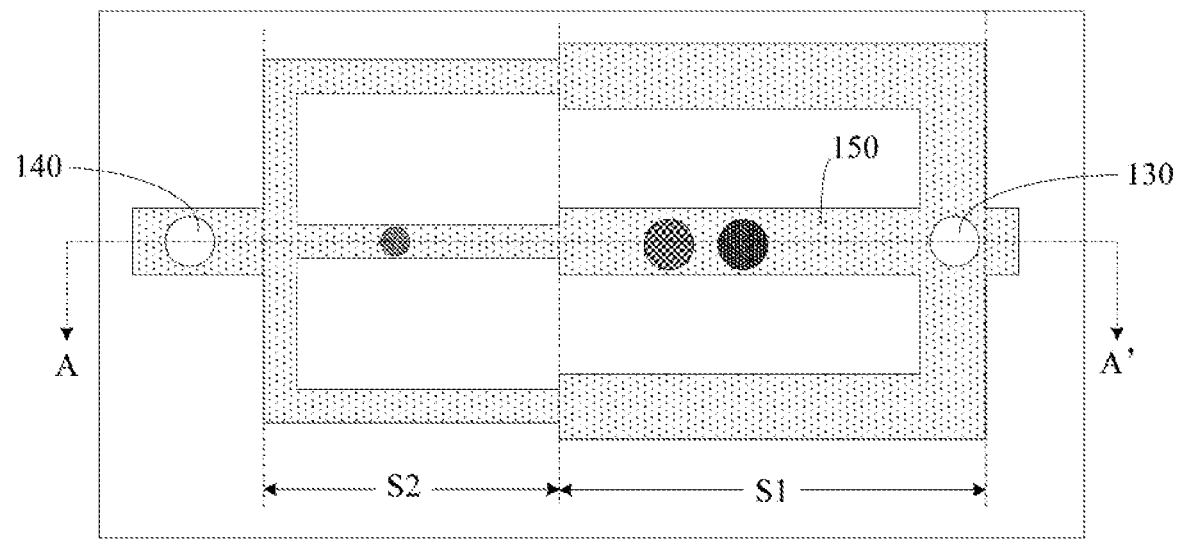
FIG. 1A is a top view of a sample preliminary screening chip provided by the embodiments of the present disclosure.

To make the objectives, technical solutions and advantages of the embodiments of the present disclosure clearer, the technical solutions in the embodiments of the present disclosure will be described clearly and completely with reference to the accompanying drawings in the embodiments of the present disclosure. Obviously, the described embodiments are only a part of the embodiments of the present disclosure, and not all the embodiments. Moreover, the embodiments in the present disclosure and the features in the embodiments may be combined with each other in case of no conflict. Based on the described embodiments of the present disclosure, all other embodiments obtained by those of ordinary skill in the art without creative efforts shall fall within the protection scope of the present disclosure.

Unless otherwise defined, technical or scientific terms used in the present disclosure shall have the ordinary meanings understood by those of ordinary skill in the art to which the present disclosure pertains. The terms "first", "second" and the like used in present disclosure do not indicate any order, quantity or importance, but are only used to distinguish different components. Words such as "comprise" or "include" indicate that an element or item appearing before such a word covers listed elements or items appearing after the word and equivalents thereof, and do not exclude other elements or items. Words such as "connect" or "joint" are not limited to physical or mechanical connections, but may include electrical connections, regardless of direct connection or indirect connection.

It should be noted that sizes and shapes in the figures of the accompanying drawings do not reflect the true scale, and are merely intended to schematically illustrate the content of the present disclosure. Furthermore, same or similar reference numerals throughout represent same or similar elements or elements having same or similar functions.

Circulating tumor cells (CTCs) are the general term for various tumor cells existing in peripheral blood, and shed from solid tumor lesions, such as primary or metastatic lesions, spontaneously or due to diagnostic operation. After entering the peripheral blood, most of CTCs undergo apoptosis or phagocytosis, while a few of CTCs can escape and anchor to develop into metastatic lesions, increasing the risk of death of a patient with a malignant tumor. In practical application, the enrichment and detection for CTCs are of great value and significance in the diagnosis and prognosis of tumor metastasis, drug development of tumor metastasis, individualized treatment of tumor metastasis, and exploration on tumor metastasis mechanisms.

CTCs have the following features: a low content, with only 1-10 CTCs in 1 mL blood of a general patient; a larger particle diameter of the cells, the particle diameters of CTCs being about 15 μm-30 μm compared with the particle diameters of white blood cells being about 7 μm-12 μm; and heterogeneity, with differences in the types and expression levels of cell surface antigen markers.

At present, methods for CTC separation and enrichment mainly include filtration, gradient density centrifugation, and immunoaffinity capture methods. In the filtration method, whole blood passes through filtration pores, as the particle diameters of CTCs are generally greater than that of white blood cells and red blood cells, CTCs can be screened based on the particle diameters of the cells. However, this method cannot distinguish other cells with particle diameters not much different from the particle diameters of the CTCs.

In the gradient density centrifugation method, a demixing fluid is added to a sample, and a corresponding gradient density distribution is formed after centrifugation due to differences in density of different types of cells, thereby achieving separation and enrichment for CTCs. However, the method requires professional technicians and frequent manual operations, thereby being not conducive to the integration of separation and enrichment.

The immunoaffinity capture method implements screening of different types of cells by using the specificity of antigen proteins expressed on the surfaces of CTCs and other blood cells in combination with corresponding antibodies. However, the method is complicated to operate, and requires the use of corresponding equipment and expensive labeled antibodies to result in a high cost, thereby limiting large-scale use of the method. Furthermore, some CTCs lose epithelial cell adhesion molecule (EpCAM) due to epithelial-mesenchymal transition, resulting in an inaccurate detecting result for CTCs.

Accordingly, the embodiments of the present disclosure provide a sample preliminary screening chip, a specimen detecting method, and a screening device, for separating out a specimen and detecting the specimen.

Figure 1B:
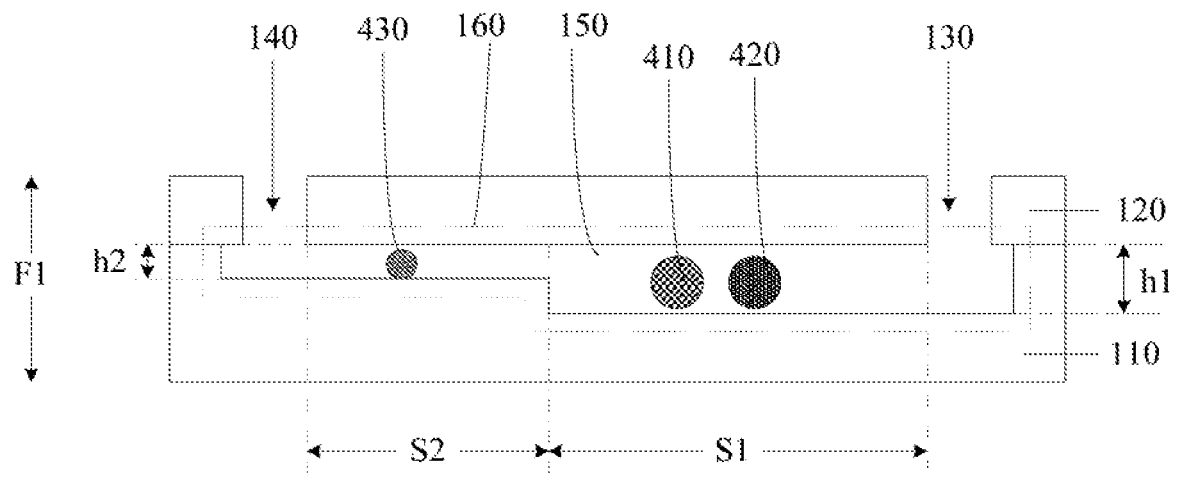
FIG. 1B is a sectional view of the sample preliminary screening chip shown in FIG. 1A along a direction AA'.
Figure 2:
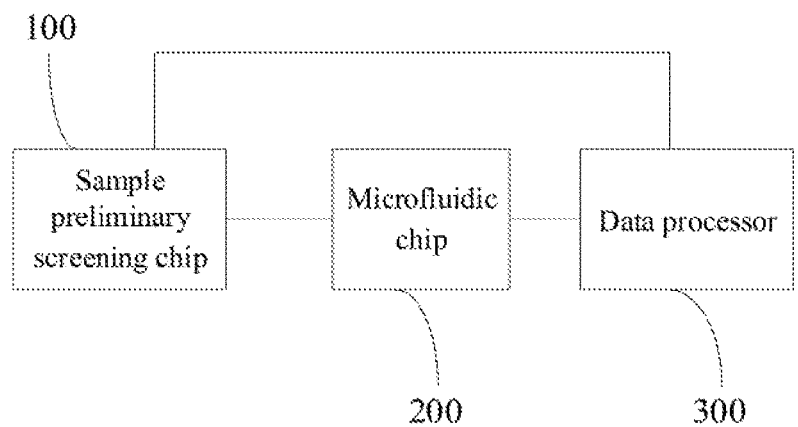
FIG. 2 is a structural schematic diagram of a screening device provided by the embodiments of the present disclosure.

As shown in FIGS. 1A and 1B, a sample preliminary screening chip provided by an embodiment of the present disclosure may include a first preliminary screening substrate 110 and a second preliminary screening substrate 120 fitted to each other, at least one channel 150 encapsulated between the first preliminary screening substrate 110 and the second preliminary screening substrate 120, a preliminary screening inlet 130 in one end of the channel 150, and a preliminary screening outlet 140 in the other end of the channel 150. Wherein the preliminary screening inlet 130 and the preliminary screening outlet 140 run through the first preliminary screening substrate 110 or the second preliminary screening substrate 120. The channel 150 includes a first preliminary screening area S1 proximate to the preliminary screening inlet 130 and a second preliminary screening area S2 proximate to the preliminary screening outlet 140. The size, in an extending direction F1 perpendicular to a plane on which the first preliminary screening area S1 is located, of the first preliminary screening area S1 is greater than a maximum particle diameter of a specimen, and the size, in the extending direction F1 perpendicular to a plane on which the first preliminary screening area S1 is located, of the second preliminary screening area S2 is smaller than a minimum particle diameter of the specimen.

The above-mentioned sample preliminary screening chip provided by an embodiment of the present disclosure may control a sample solution containing the specimen to be added into the preliminary screening inlet 130 of the sample preliminary screening chip 100; and control the sample solution in the preliminary screening inlet 130 to enter the channel 150, successively to flow through the first preliminary screening area S1 and the second preliminary screening area S2, and to flow out from the preliminary screening outlet 140 so as to store a liquid with the specimen in the first preliminary screening area S1. In this way, the liquid containing the specimen may be screened preliminarily.

Optionally, in some embodiments of the present disclosure, the preliminary screening inlet 130 and the preliminary screening outlet 140 may run through the second preliminary screening substrate 120. Of course, the preliminary screening inlet 130 and the preliminary screening outlet 140 may also run through the first preliminary screening substrate 110. In practical application, it may be designed and determined according to the actual application environment, and is not limited herein.

Optionally, as shown in FIG. 1A, the sample preliminary screening chip 100 may have three channels 150. The three channels 150 share one preliminary screening inlet 130 and one preliminary screening outlet 140. Of course, in practical application, the number of channels may be designed and determined according to the actual application environment, and is not limited herein.

Optionally, the specimen may be CTCs, and the sample solution is blood. Hence, the sample preliminary screening chip provided by the present disclosure may be used for preliminary screening for CTCs. In general, blood includes not only CTCs, but also other cells such as red blood cells, platelets, eosinophils, neutrophils, basophils, small lymphocytes, medium-sized lymphocytes, large lymphocytes, etc. The particle diameters of the CTCs are generally 15 μm-30 μm. The particle diameters of the red blood cells are generally 6 μm-10 μm. The particle diameters of the platelets are generally 2 μm-4 μm. The particle diameters of the eosinophils, the neutrophils and the basophils are generally 10 μm-15 μm. The particle diameters of the small lymphocytes are generally 5 μm-8 μm. The particle diameters of the medium-sized lymphocytes are generally 9-12 μm. The particle diameters of the large lymphocytes are generally 13 μm-20 μm. Thus, due to difference between the particle diameter of the CTCs and the particle diameter of the other cells, cells with large differences from the CTCs may be screened preliminary by the sample preliminary screening chip 100, and the CTCs and cells with particle diameters not much different from the particle diameters of the CTCs may be retained.

Optionally, in some embodiments of the present disclosure, as shown in FIGS. 1A and 1B, the sample preliminary screening chip 100 may include a groove structure 160 in a side of the first preliminary screening substrate 110 facing the second preliminary screening substrate 120; and the groove structure 160 forms the channel 150. A maximum width h1, in the extending direction F1 perpendicular to the plane on which the first preliminary screening area S1 is located, of the groove structure 160 in the first preliminary screening area S1 is greater than the maximum particle diameter of the specimen. A maximum width h2, in the extending direction F1 perpendicular to a plane on which the first preliminary screening area S1 is located, of the groove structure 160 in the second preliminary screening area S2 is smaller than the minimum particle diameter of the specimen. In this way, the groove structure 160 may be formed by etching on the first preliminary screening substrate 110, so that the channel 150 for the liquid to flow through is formed by the groove structure 160.

Optionally, the particle diameter of the specimen may be set to range from 15 μm to 30 μm. For example, the particle diameters of the CTCs range from 15 μm to 30 μm. Thus, h1 may be greater than 30 μm, and h2 may be smaller than 15 μm. Of course, the present disclosure includes but is not limited to this.

Exemplarily, optionally, the first preliminary screening substrate 110 or the second preliminary screening substrate 120 may be selected from one of a glass substrate, a plastic substrate, or a silicon substrate. Exemplarily, suitable etching methods may be selected to form the channel 150 according to different materials of the first preliminary screening substrate 110. Exemplarily, if the first preliminary screening substrate 110 is a plastic substrate, a wet etching process may be used to etch the plastic substrate to form the above-mentioned channel 150. If the first preliminary screening substrate 110 is a silicon substrate, a dry etching process may be used to etch the silicon substrate to form the above-mentioned channel 150.

Exemplarily, optionally, in areas except for the channel 150, the first preliminary screening substrate 110 and the second preliminary screening substrate 120 may be bonded and fitted to each other by using an adhesive. Thus, the sample solution can flow smoothly in the channel 150.

As shown in FIGS. 1A to 3B, the screening device provided by the embodiments of the present disclosure may include a sample preliminary screening chip 100, a microfluidic chip 200, and a data processor 300.

Optionally, in some embodiments of the present disclosure, the data processor is configured to control the sample solution containing a specimen to be added into the preliminary screening inlet of the sample preliminary screening chip; control the sample solution in the preliminary screening inlet to enter the channel, successively to flow through the first preliminary screening area and the second preliminary screening area, and to flow out from the preliminary screening outlet so as to store the liquid with the specimen in the first preliminary screening area; control the liquid in the first preliminary screening area to flow into a liquid storage tank of the microfluidic chip; control the microfluidic chip to separate multiple independent micro-sized micro-droplets from the liquid in the liquid storage tank, wherein the size of each micro-droplet is the sum of a maximum particle diameter of the specimen and an extended value; acquire Raman spectra corresponding to the respective micro-droplets; and control the microfluidic chip to move the micro-droplets with the specimen into a specimen storage tank according to the Raman spectra corresponding to the micro-droplets.

According to the above-mentioned screening device provided by some embodiments of the present disclosure, the data processor 300 may be configured to control the sample solution containing the specimen to be added into the preliminary screening inlet 130 of the sample preliminary screening chip 100; and control the sample solution in the preliminary screening inlet 130 to enter the channel 150, successively to flow through the first preliminary screening area S1 and the second preliminary screening area S2, and to flow out from the preliminary screening outlet 140 so as to store a liquid with the specimen in the first preliminary screening area S1. In this way, the liquid containing the specimen may be screened preliminarily. Furthermore, the data processor 300 controls the liquid in the first preliminary screening area S1 to flow into the liquid storage tank of the microfluidic chip 200, and control the microfluidic chip 200 to separate multiple independent micro-sized micro-droplets from the liquid in the liquid storage tank. In this way, the micro-droplets with a single specimen can be accurately controlled to enter detecting areas. Then, Raman spectroscopy detection is performed to acquire Raman spectra corresponding to the micro-droplets, and the microfluidic chip 200 is controlled to move the micro-droplets with the specimen into the specimen storage tank according to the Raman spectra corresponding to the micro-droplets. Therefore, a precise separation operation on the single specimen can be achieved.

Taking the specimen being CTCs as an example, compared with the above-mentioned filtration method, the above-mentioned specimen detecting method provided by some embodiments of the present disclosure can separate the CTCs and other cells with particle diameters substantially equivalent to the particle diameters of the CTCs, and improve the accuracy of CTC separation, thereby improving the accuracy of a CTC detecting result.

Taking the specimen being CTCs as an example, compared with the above-mentioned immunoaffinity capture method, the above-mentioned specimen detecting method provided by some embodiments of the present disclosure does not require the use of specific antibodies and fluorescent markers, and thus can prevent biomolecules from contaminating and interfering the CTCs, ensure specimen activity and reduce the detecting cost.

Taking the specimen being CTCs as an example, compared with the above-mentioned gradient density centrifugation method, the above-mentioned specimen detecting method provided by some embodiments of the present disclosure does not require complicated manual operations, can automatically process, separate out and detect the CTCs, and has a high degree of integration to facilitate clinical application.

Figure 3A:
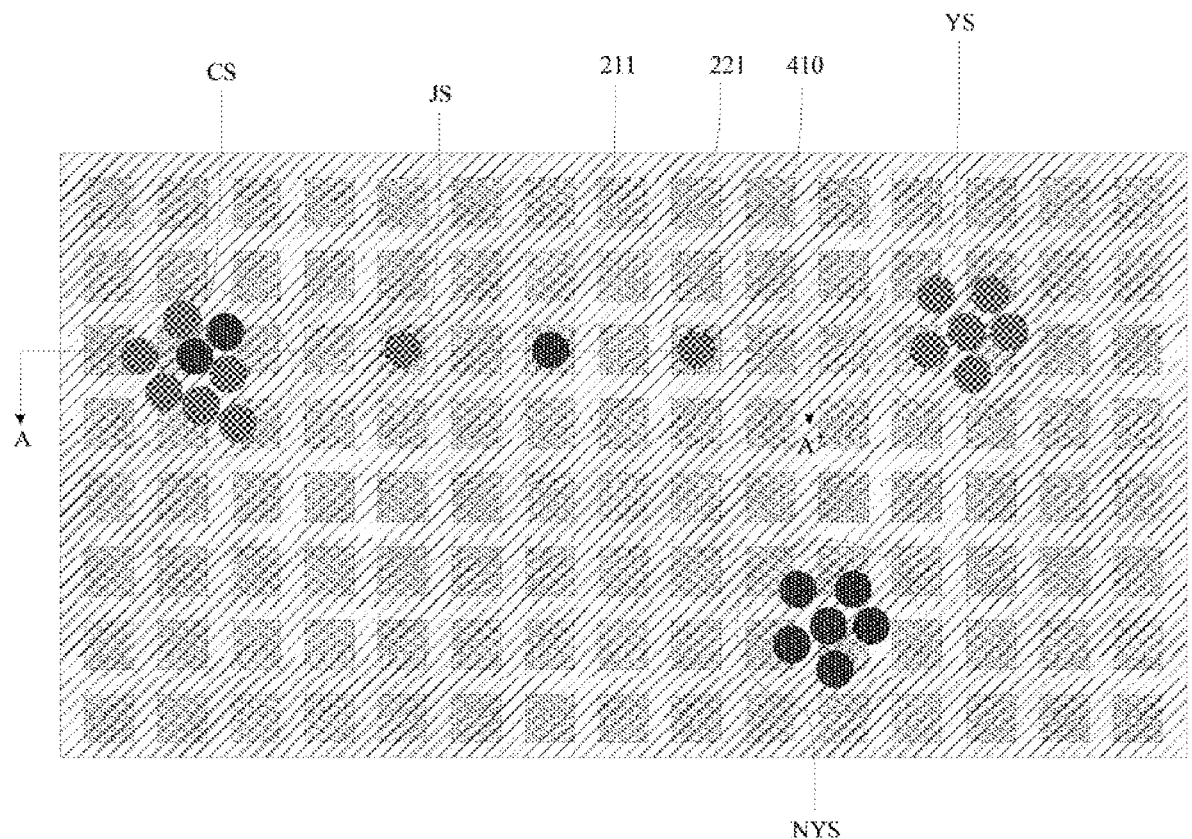
FIG. 3A is a top view of a microfluidic chip provided by the embodiments of the present disclosure.
Figure 3B:
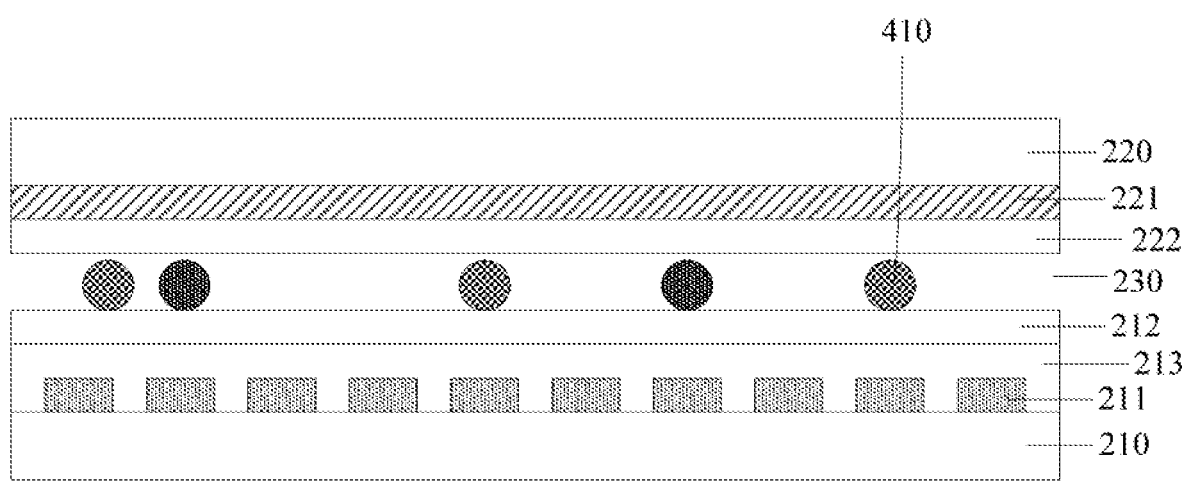
FIG. 3B is a sectional view of the microfluidic chip shown in FIG. 3A along the direction AA'.

Optionally, in some embodiments of the present disclosure, as shown in FIGS. 3A and 3B, the microfluidic chip 200 may include a first microfluidic substrate 210 and a second microfluidic substrate 220 disposed oppositely, a gap 230 encapsulated between the first microfluidic substrate 210 and the second microfluidic substrate 220, multiple driving electrodes 211 on a side, facing the second microfluidic substrate 220, of the first microfluidic substrate 210, a first hydrophobic layer 212 on a side, facing the second microfluidic substrate 220, of the driving electrodes 211, a common electrode 221 on a side, facing the first microfluidic substrate 210, of the second microfluidic substrate 220, and a second hydrophobic layer 222 on a side, facing the first microfluidic substrate 210, of the common electrode 221. Exemplarily, the first microfluidic substrate 210 or the second microfluidic substrate 220 may be selected from one of a glass substrate, a plastic substrate, or a silicon substrate.

Optionally, as shown in FIG. 3A, the microfluidic chip 200 may include a liquid storage tank CS, multiple detecting areas JS arranged at intervals, a specimen storage tank YS, and a non-specimen storage tank NYS. The liquid storage tank CS may be configured to store the liquid flowing from the sample preliminary screening chip 100. The detecting areas JS may be configured to store the micro-droplets separated from the liquid. The specimen storage tank YS may be configured to store the micro-droplets with the specimen. The non-specimen storage tank NYS may be configured to store the micro-droplets without the specimen. Further, the screening device may further include a connecting pipeline. One end of the connecting pipeline is electrically connected to a liquid inlet of the microfluidic chip 200. When the liquid filtered by the sample preliminary screening chip 100 needs to be transferred into the microfluidic chip 200, the other end of the connecting pipeline may be connected to the preliminary screening inlet 130 of the sample preliminary screening chip 100, so that the liquid is transferred from the sample preliminary screening chip 100 to the microfluidic chip 200 via the connecting pipeline.

Exemplarily, the driving electrodes 211 may be configured in a square. In addition, the size of each driving electrode 211 may be set to range from 25 μm to 500 μm, that is, the driving electrodes 211 may be configured as square electrodes of 25 μm*25 μm to 500 μm*500 μm. Optionally, the size of each driving electrode 211 may be set to range from 25 μm to 100 μm. Exemplarily, the size of each driving electrode 211 may be set to be one of 25 μm, 30 μm, 45 μm, 50 μm, 100 μm, 250 μm, or 500 μm. Of course, the present disclosure includes but is not limited to this.

Optionally, in some embodiments of the present disclosure, as shown in FIGS. 3A and 3B, multiple driving electrodes 211 may be arranged at intervals, and the microfluidic chip 200 may further include: a dielectric layer 213 between the first hydrophobic layer 212 and a layer in which the driving electrodes 211 are located, and electrode driving circuits electrically connected with the driving electrodes 211 in a one-to-one corresponding manner. The electrode driving circuits may include transistors. In practical application, the structures of the electrode driving circuits may be substantially same as the structure in the related art, and will not be repeated herein.

Optionally, in some embodiments of the present disclosure, the microfluidic chip 200 may further include a driving chip. The driving chip is electrically connected to the electrode driving circuits, and used for inputting corresponding signals to the electrode driving circuits.

Optionally, in some embodiments of the present disclosure, the material of the driving electrodes 211 may be a metal material, such as Au, Ag, Mo, Al, Pt, etc., which is not limited herein. Thus, light may be reflected.

Optionally, in some embodiments of the present disclosure, the common electrode 221 may be an integral film layer covering the second microfluidic substrate 220. Exemplarily, the material of the common electrode 221 may be a transparent conductive material, such as an indium tin oxide (ITO) material, an indium zinc oxide (IZO) material, or a carbon nanotube and graphene, which is not limited herein. Thus, light may be transmitted.

Optionally, in an embodiment of the present disclosure, the materials of the first hydrophobic layer 212 and the second hydrophobic layer 222 may include poly tetra fluoroethylene (PTFE). Of course, the present disclosure includes but is not limited to this.

Optionally, in some embodiments of the present disclosure, the material of the dielectric layer 213 may include at least one of $SiO_2$ and $SiN_x$. Of course, the present disclosure includes but is not limited to this.

Figure 4:
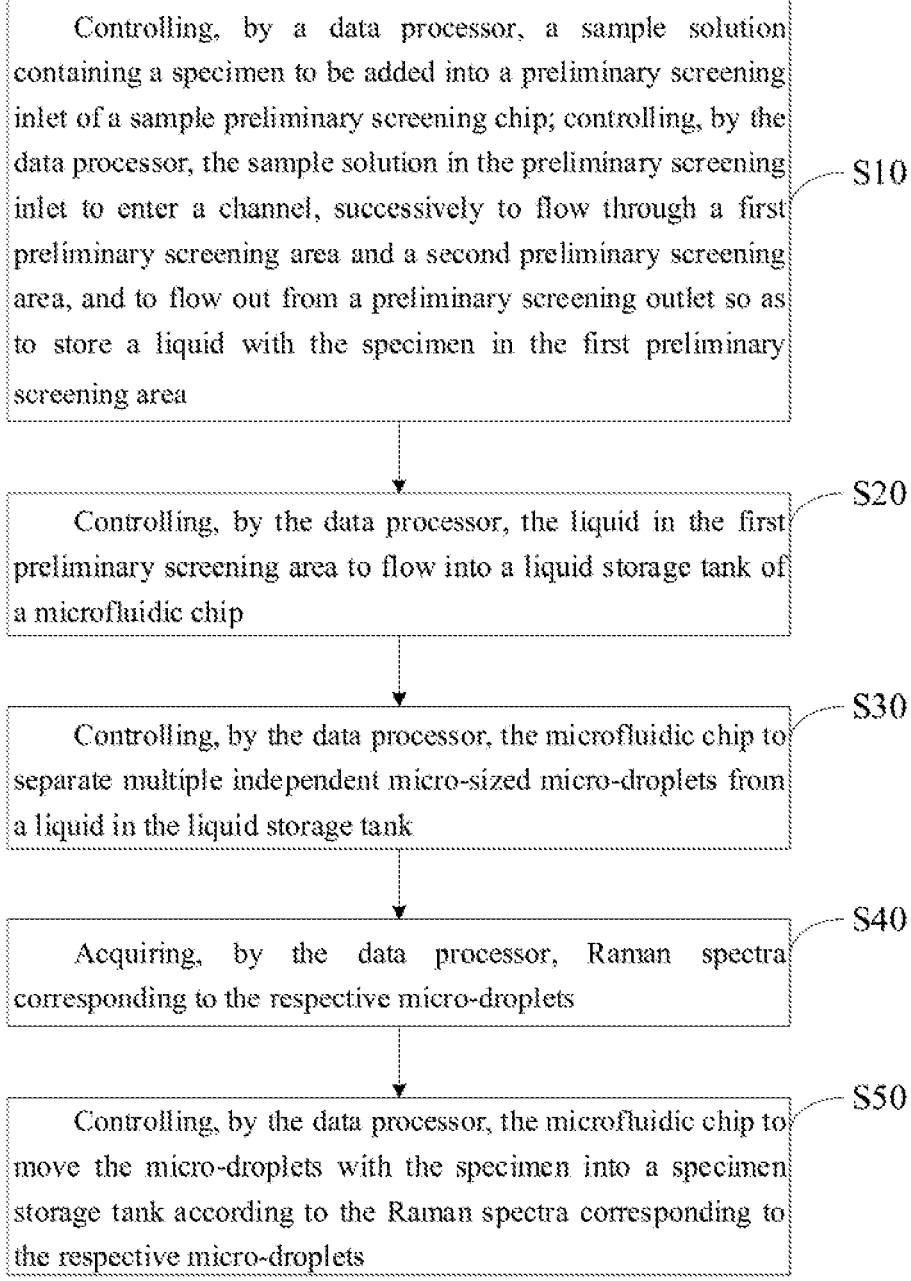
FIG. 4 is a flow diagram of a specimen detecting method provided by the embodiments of the present disclosure.

A specimen detecting method provided by the embodiment of the present disclosure, as shown in FIG. 4, may include the following steps.

S10, controlling, by a data processor 300, the sample solution containing a specimen to be added into the preliminary screening inlet 130 of the sample preliminary screening chip 100; and controlling the sample solution in the preliminary screening inlet 130 to enter the channel 150, successively to flow through the first preliminary screening area S1 and the second preliminary screening area S2, and to flow out from the preliminary screening outlet 140 so as to store the liquid with a specimen in the first preliminary screening area S1, wherein the sample preliminary screening chip 100 is the above-mentioned sample preliminary screening chip 100 provided by the embodiments of the present disclosure.

S20, controlling, by the data processor 300, the liquid in the first preliminary screening area S1 to flow into a liquid storage tank of a microfluidic chip 200.

S30, controlling, by the data processor 300, the microfluidic chip 200 to separate multiple independent micro-sized micro-droplets from the liquid in the liquid storage tank, wherein the size of each micro-droplet is the sum of a maximum particle diameter of the specimen and an extended value.

S40, acquiring, by the data processor 300, Raman spectra corresponding to the respective micro-droplets.

S50, controlling, by the data processor 300, the microfluidic chip 200 to move the micro-droplets with the specimen into a specimen storage tank according to the Raman spectra corresponding to the respective micro-droplets.

According to the above-mentioned specimen detecting method provided by the embodiment of the present disclosure, the data processor 300 is configured to control the sample solution containing the specimen to be added into the preliminary screening inlet 130 of the sample preliminary screening chip 100; and control the sample solution in the preliminary screening inlet 130 to enter the channel 150, successively to flow through the first preliminary screening area S1 and the second preliminary screening area S2, and to flow out from the preliminary screening outlet 140 so as to store a liquid with the specimen in the first preliminary screening area S1. In this way, the liquid containing the specimen may be screened preliminarily. Furthermore, the data processor 300 controls the liquid in the first preliminary screening area S1 to flow into the liquid storage tank of the microfluidic chip 200; and control the microfluidic chip 200 to separate the liquid in the liquid storage tank into multiple independent micro-sized micro-droplets. In this way, the micro-droplets with a single specimen may be accurately control to enter detecting areas. Then, Raman spectroscopy detection is performed to acquire Raman spectra corresponding to the micro-droplets, and the microfluidic chip 200 is controlled to move the micro-droplets with the specimen into the specimen storage tank according to the Raman spectra corresponding to the micro-droplets. Therefore, a precise separation operation on the single specimen can be achieved.

Taking the specimen being CTCs as an example, compared with the above-mentioned filtration method, the above-mentioned specimen detecting method provided by some embodiments of the present disclosure can separate the CTCs from other cells with particle diameters substantially equivalent to the particle diameters of the CTCs, and improve the accuracy of CTC separation, thereby improving the accuracy of a CTC detecting result.

Taking the specimen being CTCs as an example, compared with the above-mentioned immunoaffinity capture method, the above-mentioned specimen detecting method provided by some embodiments of the present disclosure does not require the use of specific antibodies and fluorescent markers, and thus can prevent biomolecules from contaminating and interfering the CTCs, ensure specimen activity and reduce the detecting cost.

Taking the specimen being CTCs as an example, compared with the above-mentioned gradient density centrifugation method, the above-mentioned specimen detecting method provided by some embodiments of the present disclosure does not require complicated manual operations, can automatically process, separate out and detect the CTCs, and has a high degree of integration to facilitate clinical application.

It should be noted that the size of each micro-droplet is the sum of a maximum particle diameter of the specimen and an extended value Δ. Exemplarily, taking a specimen being CTCs as an example, the size of each micro-droplet may be the sum of the maximum particle diameter (30 μm) of the CTCs and the extended value Δ, that is, 30 μm+Δ. Δ may be set to be 1 μm, 2 μm or other values. In practical application, the specific value of Δ may be designed according to the actual application environment, and is not limited herein.

Optionally, the screening device may further include a detecting device. The detecting device may be used for detecting the specimen in the specimen storage tank. In some embodiments of the present disclosure, after the step S50 of controlling, by the data processor 300, the microfluidic chip 200 to move the micro-droplets with the specimen into a specimen storage tank according to the Raman spectra corresponding to the micro-droplets, the method may further include: controlling, by the data processor 300, the detecting device to detect the specimen in the specimen storage tank. Exemplarily, the specimen in the specimen storage tank may be separated again and then subjected to subsequent treatment (for example, re-cultivation, and extraction of active substances). Alternatively, the specimen in the specimen storage tank may also be directly subjected to subsequent treatment (for example, re-cultivation, and extraction of active substances). Taking a specimen being CTCs as an example, as only the CTCs are stored in the specimen storage tank, the accuracy of a detecting result may be improved during subsequent treatment (for example, re-cultivation, and extraction of active substances).

Optionally, in some embodiments of the present disclosure, after the step S10 and before the step S20, the method may further include: controlling, by the data processor 300, a cleaning solution to be added into the preliminary screening inlet 130 to clean cells retained in the first preliminary screening area S1.

Optionally, in some embodiments of the present disclosure, the step S30 of controlling, by the data processor 300, the microfluidic chip 200 to separate multiple independent micro-sized micro-droplets from the liquid in the liquid storage tank may specifically include: controlling, by the data processor 300, the microfluidic chip 200 to separate the liquid in the liquid storage tank to separate out micro-droplets; and controlling the micro-droplets being separate out to enter detecting areas respectively to form multiple independent micro-droplets.

Optionally, in some embodiments of the present disclosure, the step S40 of acquiring, by the data processor 300, Raman spectra corresponding to the respective micro-droplets may specifically include: controlling, by the data processor 300, a Raman spectrometer with a set laser wavelength to scan the respective micro-droplets, and collecting Raman spectra corresponding to the respective micro-droplets. Exemplarily, the set laser wavelength may be 532 nm or 785 nm. The Raman spectrum may be set to range from 500 $cm^{-1}$ to 2,000 $cm^{-1}$. Of course, the present disclosure includes but is not limited to this.

Figure 5:
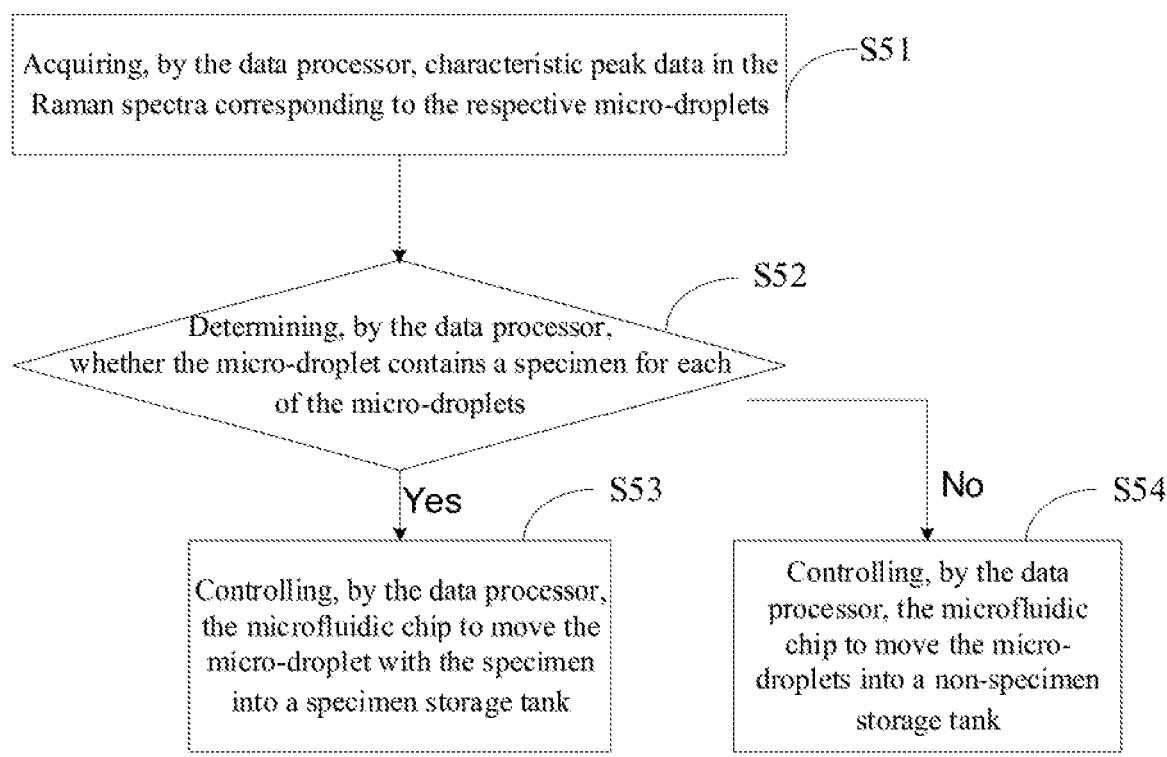
FIG. 5 is a flow diagram of another specimen detecting method provided by the embodiments of the present disclosure.

In some embodiments of the present disclosure, the step S50 of controlling, by the data processor 300, the microfluidic chip 200 to move the micro-droplets with the specimen into a specimen storage tank according to the Raman spectra corresponding to the respective micro-droplets, as shown in FIG. 5, may specifically include the following steps.

S51, acquiring, by the data processor 300, characteristic peak data in the Raman spectra corresponding to the respective micro-droplets.

S52, determining, by the data processor 300, whether the micro-droplet contains a specimen for each of the micro-droplets, by comparing the characteristic peak data corresponding to the micro-droplet with a pre-stored corresponding relationship between a specimen and characteristic peak data; executing a step S53 in response to the micro-droplet containing the specimen, otherwise, executing a step S54 in response to the micro-droplet not containing the specimen.

S53, controlling, by the data processor 300, the microfluidic chip 200 to move the micro-droplet with the specimen into the specimen storage tank.

S54, controlling, by the data processor 300, the microfluidic chip 200 to move the micro-droplet to a non-specimen storage tank.

Exemplarily, a laser which emits laser light with a wavelength of 532 nm or 785 nm is adopted to perform Raman spectrum scanning on cells in a single micro-droplet, wherein the Raman spectrum range may be set to be 500 $cm^{-1}$ to 2000 $cm^{-1}$, to obtain a Raman spectrum corresponding to each micro-droplet. Then, the Raman spectrum corresponding to each micro-droplet is processed by a Raman spectrum analysis algorithm to extract characteristic peak data in each Raman spectrum. For example, the characteristic peak data may include the intensity and frequency of the characteristic peak. Then, comparison is performed on the characteristic peak data and the pre-stored corresponding relationship between the specimen and the characteristic peak data to determine whether the micro-droplet contains the specimen. Taking a specimen being CTCs as an example, the pre-stored corresponding relationship between the specimen and the characteristic peak data may be a database formed by a pre-stored corresponding relationship between CTCs and characteristic peak data of a Raman spectrum of the CTCs. Thus, comparison is performed between the extracted characteristic peak data and the pre-stored corresponding relationship between the CTCs and the characteristic peak data of the Raman spectrum of the CTCs to determine whether the micro-droplet contains CTCs. For example, the acquired characteristic peak data of the micro-droplet contains characteristic peaks of 1003 $cm^{-1}$, 1449 $cm^{-1}$ and 1666 $cm^{-1}$, and if the characteristic peaks acquired conform to CTC characteristic peaks in the database, the micro-droplet is determined to contain the CTCs.

Optionally, in some embodiments of the present disclosure, the step S53 of controlling, by the data processor 300, the microfluidic chip 200 to move the micro-droplet with the specimen into the specimen storage tank may specifically include: generating, by the data processor 300, a first level signal, and controlling the microfluidic chip 200 to move the micro-droplets with the specimen into the specimen storage tank by providing the first level signal to the microfluidic chip 200. Exemplarily, the first level signal may be a high level signal or a logic signal "1". Specifically, taking a specimen being CTCs as an example, the data processor 300 generates a logic signal "1" and provides the logic signal "1" to a driving chip of the microfluidic chip 200, and the driving chip inputs a corresponding drive signal to the microfluidic chip to move the micro-droplets with CTCs 410 into the specimen storage tank.

Optionally, in some embodiments of the present disclosure, the step S54 of controlling, by the data processor 300, the microfluidic chip 200 to move the micro-droplet to a non-specimen storage tank may specifically include: generating, by the data processor 300, a second level signal, and controlling the microfluidic chip 200 to move the micro-droplets into the non-specimen storage tank by providing the second level signal to the microfluidic chip 200. Exemplarily, the second level signal may be a low level signal or a logic signal "0". Specifically, taking a specimen being CTCs as an example, the data processor 300 generates a logic signal "0" and provides the logic signal "0" to the driving chip of the microfluidic chip 200, and the driving chip inputs a corresponding driving signal to the microfluidic chip to move the micro-droplets without CTCs 410 into the non-specimen storage tank.

Optionally, in some embodiments of the present disclosure, the screening device may further include a driving pump. The sample solution in the preliminary screening inlet is driven into the channel by the driving pump, successively flows through the first preliminary screening area and the second preliminary screening area, and flows out from the preliminary screening outlet.

Taking a specimen being CTCs and a sample solution being blood as an example, a specimen detecting method provided by an embodiment of the present disclosure will be described below with reference to FIGS. 1A to 3B.

The specimen detecting method provided by the embodiments of the present disclosure may include the following steps.

(1) The data processor 300 controls blood to be added into the preliminary screening inlet 130 of the sample preliminary screening chip 100.

(2) The data processor 300 controls the driving pump so that the driving pump drives the blood to flow, and the blood successively flows through a first preliminary screening area S1 and a second preliminary screening area S2 and flows out from a preliminary screening outlet 140. Due to different particle diameters of different cells, cells with smaller particle diameters (such as red blood cells 430, platelets, small lymphocytes, medium-sized lymphocytes, eosinophils with particle diameters less than 15 µm, neutrophils with particle diameters less than 15 µm, and basophils with particle diameters less than 15 µm) flow out through the preliminary screening outlet 140, and cells with larger particle diameters (such as CTCs 410, eosinophils with particle diameters equal to 15 µm, neutrophils with particle diameters equal to 15 µm, basophils with particle diameters equal to 15 µm, and large lymphocytes 420 with particle diameters not less than 15 µm) are retained in the first preliminary screening area S1.

(3) The data processor 300 controls a cleaning solution to be added into the preliminary screening inlet 130 to clean the cells retained in the first preliminary screening area S1.

(4) The data processor 300 controls a connecting pipeline to be connected to the preliminary screening inlet 130 to transfer a cleaned cell liquid in the first preliminary screening area S1 to a microfluidic chip 200 and stores the liquid in a liquid storage tank CS; then, the microfluidic chip 200 is controlled to separate the liquid in the liquid storage tank CS to separate out micro-droplets; and the micro-droplets being separate out are controlled to enter detecting areas JS respectively to form multiple independent micro-droplets. Exemplarily, the data processor 300 may input a signal to a driving chip to control the driving chip to input a corresponding signal to the microfluidic chip 200, for example controlling driving electrodes to be powered on or off in a certain order to separate micro-droplets from the liquid. Of course, the driving electrodes may also be powered on or off for multiple times, so that each micro-droplet separated out may contain at most one cell. Exemplarily, different driving electrodes and a common electrode are respectively loaded with corresponding voltages to drive the micro-droplets to be separated out and moved according to the electrowetting-on-dielectric principle.

(5) A Raman spectrometer having a laser that emits laser light with a wavelength of 532 nm or 785 nm is configured to perform Raman spectrum scanning on cells in a single micro-droplet, wherein the Raman spectrum range may be set to be 500 $cm^{-1}$ to 2000 $cm^{-1}$, to obtain a Raman spectrum corresponding to each micro-droplet.

(6) The Raman spectrum corresponding to each micro-droplet is processed by a Raman spectrum analysis algorithm to extract characteristic peak data in each Raman spectrum. For example, the characteristic peak data may include the intensity and frequency of a characteristic peak.

(7) Comparison is performed on the extracted characteristic peak data and a pre-stored corresponding relationship between CTCs and characteristic peak data of a Raman spectrum of the CTCs to determine whether the micro-droplet contains CTCs 410.

(8) If the acquired characteristic peak data of the micro-droplet contains characteristic peaks of 1003 $cm^{-1}$, 1449 $cm^{-1}$ and 1666 $cm^{-1}$, the characteristic peaks conform to the CTC characteristic peaks in a database, and the micro-droplet is determined to contain the CTCs. Then, the data processor 300 generates a logic signal "1" and provides the logic signal "1" to the driving chip of the microfluidic chip 200, and the driving chip inputs a corresponding driving signal to the microfluidic chip to move the micro-droplet with the CTCs 410 to the specimen storage tank YS.

(9) If the acquired characteristic peak data of the micro-droplet does not contain the characteristic peaks of 1003 $cm^{-1}$, 1449 $cm^{-1}$, 1666 $cm^{-1}$ and other characteristic peaks, the characteristic peaks do not conform to the CTC characteristic peaks in the database, and the micro-droplet is determined to not contain the CTCs. Alternatively, if the characteristic peak data does not contain the characteristic peaks of 1003 $cm^{-1}$, 1449 $cm^{-1}$, 1666 $cm^{-1}$ and other characteristic peaks, the micro-droplet is determined to not contain the CTCs. Then, the data processor 300 generates a logic signal "0" and provides the logic signal "0" to the driving chip of the microfluidic chip 200, and the driving chip inputs a corresponding driving signal to the microfluidic chip to move the micro-droplet to a non-specimen storage tank NYS.

(10) The CTCs in the specimen storage tank YS are subjected to subsequent treatment, such as extraction of active substances and re-cultivation.

The above-mentioned specimen detecting method provided by the embodiments of the present disclosure can implement the preliminary screening, separating, detecting and enriching processes of the blood sample solution, has high system integration, and can achieve fully automatic processing and analysis of the specimen. Moreover, the microfluidic chip provides a precise operation and control platform for separation of cells, and achieves cell separation in vivo in combination with a Raman spectroscopy technology, thereby effectively preventing markers from interfering and contaminating biomolecules in the cells, effectively reducing the detecting cost, and improving the accuracy of separation and subsequent specimen characteristic detection.

In the sample preliminary screening chip, the specimen detecting method and the screening device provided by the embodiments of the present disclosure, the data processor may be configured to control the sample solution containing the specimen to be added into the preliminary screening inlet of the sample preliminary screening chip; and control the sample solution in the preliminary screening inlet to enter the channel, successively to flow through the first preliminary screening area and the second preliminary screening area, and to flow out from the preliminary screening outlet so as to store a liquid with the specimen in the first preliminary screening area. In this way, the liquid containing the specimen may be screened preliminarily. Furthermore, the data processor controls the liquid in the first preliminary screening area to flow into the liquid storage tank of the microfluidic chip, and controls the microfluidic chip to separate multiple independent micro-sized micro-droplets from the liquid in the liquid storage tank. In this way, the micro-droplets with a single specimen can be accurately controlled to enter detecting areas. Then, Raman spectroscopy detection is performed to acquire the Raman spectra corresponding to the micro-droplets, and the microfluidic chip is controlled to move the micro-droplets with the specimen into the specimen storage tank according to the Raman spectra corresponding to the micro-droplets. Therefore, the precise separation operation on the single specimen can be achieved.

Apparently, those skilled in the art can make changes and modifications to the present disclosure without departing from the spirit and scope of the present disclosure. Thus, the present disclosure is also intended to encompass these changes and modifications if these changes and modifications of the present disclosure are within the scope of the claims of the present disclosure and equivalents thereof.

What is claimed is:

1. A specimen detecting method, comprising:
controlling, by a data processor, a sample solution containing a specimen to be added into a preliminary screening inlet of a sample preliminary screening chip; wherein the sample preliminary screening chip comprises:
  a first preliminary screening substrate and a second preliminary screening substrate fitted to each other;
  a groove structure of the first preliminary screening substrate facing the second preliminary screening substrate;
  wherein the groove structure forms a channel encapsulated between the first preliminary screening substrate and the second preliminary screening substrate, and the channel is provided with two ends; and
  the preliminary screening inlet in one of the two ends of the channel, and a preliminary screening outlet in the other one of the two ends of the channel; wherein the preliminary screening inlet and the preliminary screening outlet run through the second preliminary screening substrate; the groove structure comprises a first groove structure and a second groove structure, the first groove structure is provided with a first depth in a direction perpendicular to a plane on which the first preliminary screening substrate is located, and the second groove structure is provided with a second depth in the direction perpendicular to the plane on which the first preliminary screening substrate is located; the channel is a preliminary screening area; in a direction from the preliminary screening inlet to the preliminary screening outlet, the preliminary screening area is divided into a first preliminary screening sub-area and a second preliminary screening sub-area; the first groove structure forms the first preliminary screening sub-area and the second groove structure forms the second preliminary screening sub-area; and
  the first depth is greater than a maximum particle diameter of the specimen contained in the sample solution, and the second depth is smaller than a minimum particle diameter of the specimen;
controlling, by the data processor, the sample solution in the preliminary screening inlet to enter the channel, and controlling, by the data processor, a part of the sample solution to flow successively through the first preliminary screening sub-area and the second preliminary screening sub-area, and to flow out from the preliminary screening outlet so as to store a liquid with the specimen in the first preliminary screening sub-area;
controlling, by the data processor, the liquid in the first preliminary screening sub-area to flow into a liquid storage tank of a microfluidic chip;
controlling, by the data processor, the microfluidic chip to separate micro-droplets from a liquid in the liquid storage tank, wherein the micro-droplets are independent and micro-sized, a size of each of the micro-droplets is the sum of a maximum particle diameter of the specimen and a preset value;
acquiring, by the data processor, Raman spectra corresponding to each of the micro-droplets; and
controlling, by the data processor, the microfluidic chip to move at least one micro-droplet, among the micro-droplets, with the specimen into a specimen storage tank according to the Raman spectra corresponding to each of the micro-droplets.

2. The specimen detecting method according to claim 1, wherein the controlling, by the data processor, the microfluidic chip to move the at least one micro-droplet with the specimen into a specimen storage tank according to the Raman spectra corresponding to each of the micro-droplets comprises:
  acquiring, by the data processor, characteristic peak data in the Raman spectra corresponding to each of the micro-droplets;
  determining for each of the micro-droplets, by the data processor, whether the each micro-droplet contains a specimen, by comparing the characteristic peak data corresponding to the each micro-droplet with a pre-stored corresponding relationship between a specimen and characteristic peak data; and
  controlling, by the data processor, the microfluidic chip to move the each micro-droplet with the specimen into a specimen storage tank in response to the each micro-droplet containing the specimen.

3. The specimen detecting method according to claim 2, wherein the controlling, by the data processor, the microfluidic chip to move the each micro-droplet with the specimen into a specimen storage tank in response to the each micro-droplet containing the specimen comprises:
  generating, by the data processor, a first level signal in response to the each micro-droplet containing the specimen, wherein the first level signal is a signal used for controlling the microfluidic chip to move the each micro-droplet with the specimen into the specimen storage tank; and
  providing, by the data processor, the first level signal to the microfluidic chip.

4. The specimen detecting method according to claim 2, further comprising:
  generating, by the data processor, a second level signal in response to the each micro-droplet not containing the specimen, wherein the second level signal is a signal used for controlling the microfluidic chip to move the each micro-droplet into a non-specimen storage tank; and
  providing, by the data processor, the second level signal to the microfluidic chip.

5. The specimen detecting method according to claim 3, further comprising:
  generating, by the data processor, a second level signal in response to the each micro-droplet not containing the specimen, wherein the second level signal is a signal used for controlling the microfluidic chip to move the each micro-droplet into a non-specimen storage tank; and
  providing, by the data processor, the second level signal to the microfluidic chip.

6. The specimen detecting method according to claim 1, wherein the acquiring, by the data processor, Raman spectra corresponding to each of the micro-droplets comprises:
  controlling, by the data processor, a Raman spectrometer with a set laser wavelength to scan each of the micro-droplets; and
  collecting, by the data processor, the Raman spectra corresponding to each of the micro-droplets.

7. The specimen detecting method according to claim 2, wherein the acquiring, by the data processor, Raman spectra corresponding to each of the micro-droplets comprises:

controlling, by the data processor, a Raman spectrometer with a set laser wavelength to scan each of the micro-droplets; and collecting, by the data processor, the Raman spectra corresponding to each of the micro-droplets.

8. The specimen detecting method according to claim 3, wherein the acquiring, by the data processor, Raman spectra corresponding to each of the micro-droplets comprises:

controlling, by the data processor, a Raman spectrometer with a set laser wavelength to scan each of the micro-droplets; and collecting, by the data processor, the Raman spectra corresponding to each of the micro-droplets.

9. The specimen detecting method according to claim 1, wherein after the controlling, by the data processor, the microfluidic chip to move the at least one micro-droplet with the specimen into the specimen storage tank according to the Raman spectra corresponding to each of the micro-droplets, the method further comprises:

controlling, by the data processor, a detecting device to detect a specimen in the specimen storage tank.

10. The specimen detecting method according to claim 2, wherein after the controlling, by the data processor, the microfluidic chip to move the at least one micro-droplet with the specimen into the specimen storage tank according to the Raman spectra corresponding to each of the micro-droplets, the method further comprises:

controlling, by the data processor, a detecting device to detect a specimen in the specimen storage tank.

11. The specimen detecting method according to claim 3, wherein after the controlling, by the data processor, the microfluidic chip to move the at least one micro-droplet with the specimen into the specimen storage tank according to the Raman spectra corresponding to each of the micro-droplets, the method further comprises:

controlling, by the data processor, a detecting device to detect a specimen in the specimen storage tank.

12. A screening device, comprising a sample preliminary screening chip, a microfluidic chip, and a data processor, wherein the sample preliminary screening chip comprises:

a first preliminary screening substrate and a second preliminary screening substrate fitted to each other;

a groove structure of the first preliminary screening substrate facing the second preliminary screening substrate;

wherein the groove structure forms a channel encapsulated between the first preliminary screening substrate and the second preliminary screening substrate, and the channel is provided with two ends; and a preliminary screening inlet in one of the two ends of the channel, and a preliminary screening outlet in the other one of the two ends of the channel; wherein the preliminary screening inlet and the preliminary screening outlet run through the second preliminary screening substrate; the groove structure comprises a first groove structure and a second groove structure, the first groove structure is provided with a first depth in a direction perpendicular to a plane on which the first preliminary screening substrate is located, and the second groove structure is provided with a second depth in the direction perpendicular to the plane on which the first preliminary screening substrate is located; the channel is a preliminary screening area; in a direction from the preliminary screening inlet to the preliminary screening outlet, the preliminary screening area is divided into a first preliminary screening sub-area and a second preliminary screening sub-area; the first groove structure forms the first preliminary screening sub-area and the second groove structure forms the second preliminary screening sub-area; and the first depth is greater than a maximum particle diameter of a specimen contained in a sample solution, and the second depth is smaller than a minimum particle diameter of the specimen; and the data processor is configured to perform the specimen detecting method according to claim 1.

13. The screening device according to claim 12, wherein the screening device further comprises a detecting device; and the data processor is further configured to control the detecting device to detect a specimen in a specimen storage tank after the data processor controls the microfluidic chip to move the at least one micro-droplet with the specimen into the specimen storage tank according to Raman spectra corresponding to each of the micro-droplets.

14. The screening device according to claim 12, wherein the sample preliminary screening chip comprises:

a groove structure on a side of the first preliminary screening substrate facing the second preliminary screening substrate; and the groove structure forms the channel; wherein a maximum width, in the direction perpendicular to a plane on which the first preliminary screening substrate is located, of the groove structure in the first preliminary screening sub-area is greater than the maximum particle diameter of the specimen; and a maximum width, in the direction perpendicular to a plane on which the first preliminary screening substrate is located, of the groove structure in the second preliminary screening sub-area is smaller than the minimum particle diameter of the specimen.

15. The screening device according to claim 13, wherein the sample preliminary screening chip comprises:

a groove structure on a side of the first preliminary screening substrate facing the second preliminary screening substrate; and the groove structure forms the channel; wherein a maximum width, in the direction perpendicular to a plane on which the first preliminary screening substrate is located, of the groove structure in the first preliminary screening sub-area is greater than the maximum particle diameter of the specimen; and a maximum width, in the direction perpendicular to a plane on which the first preliminary screening substrate is located, of the groove structure in the second preliminary screening sub-area is smaller than the minimum particle diameter of the specimen.

16. The screening device according to claim 12, wherein: the specimen is circulating tumor cells; the sample solution is blood; and the particle diameter of the specimen ranges from 15 µm to 30 µm.

* * * * *